(No Model.)
F. NEUKIRCH.
SOLIDIFICATION OF LOOSE GROUND FOR FOUNDATIONS, &c.
No. 416,180. Patented Dec. 3, 1889.
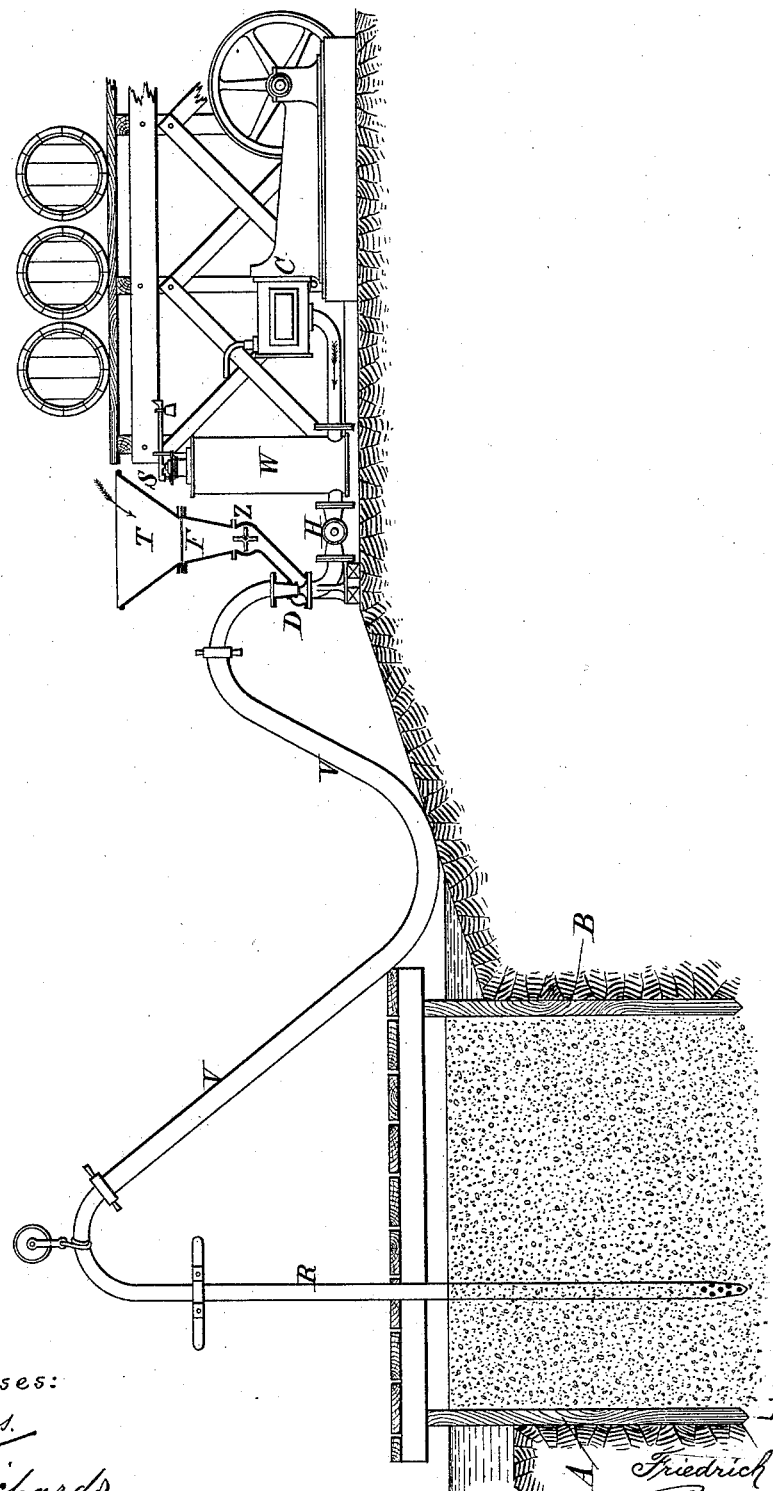

UNITED STATES PATENT OFFICE.

FRIEDRICH NEUKIRCH, OF BREMEN, GERMANY.

SOLIDIFICATION OF LOOSE GROUND FOR FOUNDATIONS, &c.

SPECIFICATION forming part of Letters Patent No. 416,180, dated December 3, 1889.

Application filed March 28, 1889. Serial No. 305,056. (No model.) Patented in Germany July 24, 1888, No. 46,842, and in England August 8, 1888, No. 11,456.

*To all whom it may concern:*

Be it known that I, FRIEDRICH NEUKIRCH, a subject of the Emperor of Germany, residing at Börse Zimmer, No. 19, Bremen, Germany, have invented a new and useful Improved Method of Effecting the Solidification of Loose Ground for Making Foundations and other Purposes, also Applicable for Making Concrete or Mortar, (for which I have obtained a patent in Great Britain, No. 11,456, bearing date August 8, 1888; also a patent in Germany, No. 46,842, dated July 24, 1888,) of which the following is a specification.

My invention has mainly for its object to effect the solidification of loose ground—such as sand or gravel—either under water or on dry ground, so as to serve as solid foundations, without the necessity of excavating the soil for the purpose of introducing masses of concrete, such as was heretofore required. For this purpose I force into the loose ground, by means of air-pressure, cement powder or other binding material in a finely-divided dry pulverulent form, so as to cause it to penetrate throughout the interstices between the particles of sand, gravel, &c., whereupon the moisture of the soil will cause the particles of cement to set, thus binding the soil into a solid mass. If the moisture of the soil is not sufficient for this purpose, water may be afterward added to the requisite extent. Where necessary, the extent of ground so acted upon may be confined by driving into the same an inclosure of boarding or other suitable material, as shown at A B on the accompanying drawings.

For effectually causing the cement powder to penetrate to the required extent into the ground, I employ, by preference, apparatus in which an air-compressing engine C forces air into an air-vessel W, provided with a safety-valve S, from which it is admitted by a cock or valve H to an injector apparatus D, connected by a flexible or jointed pipe V to a metal tube R, with closed pointed lower end, which is sunk to the required depth into the ground to be acted upon, and has at its lower end a number of holes through which the air can issue. To the injector apparatus D is connected the lower end of a funnel-shaped hopper T, having a grating or sieve at F, onto which is charged the powdered cement, so that this, in falling through the grating (which retains any coarse particles) into the space of the injector apparatus surrounding the air-nozzle, is carried forward in a finely-divided form by the air-blast, and, in issuing with this through the holes of the tube R, is made to penetrate throughout the whole mass of the soil, the tube R being from time to time shifted in position, so as to operate upon the soil from different points, in order to obtain a more or less uniform dissemination of the cement powder. The hopper is provided with a suitable feed-roller or other device at Z, whereby the supply of cement to the injector can be regulated, and, when required, entirely stopped, so that, for instance, when sinking the tube R into the soil, this may be facilitated by blowing through air without any cement, so as to blow away the soil immediately surrounding the lower end of the tube. A blast of air alone may also be used after the cement has been introduced, for the purpose of effectually mixing the cement with the soil. The above-described method of operating may also be employed for solidifying sea-shores and river-banks, in which case the inclosure of the soil to be acted upon may be dispensed with; also, by inserting the tube R into heaps of sand or gravel and forcing in powdered cement, &c., as above described, these may be converted into cement or mortar for building purposes, water being afterward added, both in this and the previous cases, when the material is not sufficiently moist.

When the soil consists of very coarse sand, pebbles, or gravel having considerable interstices between the coarser particles, there may be forced in by the air-blast, together with the cement, fine sand, slag powder, or coal-ashes, in order to fill in these interstices without expending too much cement. The above-described method may also be used when driving tunnels or shafts through water-bearing strata, in order to solidify the portions of the latter immediately surrounding the tunnel, &c.

In place of air-pressure, steam may be used for forcing in the cement powder.

Having thus described the nature of my in- vention and the best means I know for carrying the same into practical effect, I claim—

The method, substantially as herein described, of solidifying loose ground, or for converting loose material into concrete or mortar, by forcing a binding material, such as cement in the form of powder, into the loose ground or material by means of a blast of air or steam.

In testimony whereof I have signed my name to this specification, in the presence of two subscribing witnesses, this 13th day of March, A. D. 1889.

FRIEDRICH NEUKIRCH.

Witnesses:
O. TROTTIGER,
HENRI J. BEHRENS.